US011571749B2

(12) United States Patent
Pieger et al.

(10) Patent No.: US 11,571,749 B2
(45) Date of Patent: Feb. 7, 2023

(54) LIFTING APPARATUSES FOR BUILDING CYLINDERS IN MACHINES FOR PRODUCING 3D COMPONENTS, AND METHODS FOR CONTROLLING THE LIFTING APPARATUSES

(71) Applicant: TRUMPF Laser—und Systemtechnik GmbH, Ditzingen (DE)

(72) Inventors: Markus Pieger, Wendlingen am Neckar (DE); Tim Geisler, Brackenheim (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 149 days.

(21) Appl. No.: 16/851,654

(22) Filed: Apr. 17, 2020

(65) Prior Publication Data
US 2020/0254524 A1  Aug. 13, 2020

Related U.S. Application Data

(63) Continuation of application No. PCT/EP2018/077637, filed on Oct. 10, 2018.

(30) Foreign Application Priority Data

Oct. 19, 2017  (DE) .......................... 102017124424.7

(51) Int. Cl.
*B22F 12/00* (2021.01)
*B33Y 10/00* (2015.01)
(Continued)

(52) U.S. Cl.
CPC .............. *B22F 12/00* (2021.01); *B33Y 10/00* (2014.12); *B33Y 30/00* (2014.12); *B22F 10/10* (2021.01)

(58) Field of Classification Search
None
See application file for complete search history.

(56) References Cited

U.S. PATENT DOCUMENTS 6,554,600 B1 *  4/2003  Hofmann ................ B29C 41/34
                                                      425/182
2006/0032838 A1 *  2/2006  Muylaert ............... B33Y 40/00
                                                      219/121.85
(Continued)

FOREIGN PATENT DOCUMENTS

DE       3617990 C2    2/1995
DE    102005030854 B3   3/2007
(Continued)

OTHER PUBLICATIONS

PCT International Search Report & Written Opinion in International Appln. No. PCT/EP2018/077637, dated Dec. 21, 2018, 19 pages (with English translation).

*Primary Examiner* — Michael P. Rodriguez
(74) *Attorney, Agent, or Firm* — Fish & Richardson P.C.

(57) ABSTRACT

The disclosure features lifting apparatuses for building cylinders in machines for producing 3D components. The apparatuses include a first bracket that receives the building cylinder, a first guide body that controls the first bracket movably and moves the building cylinder into a working plane in a process chamber, and a main drive that controls a piston that can be coupled to a substrate plate of the building cylinder with a stroke movement. At least one further guide body is associated with the first guide body, and both guide bodies are movable on at least one guide. The additional guide body has a bracket on which the main drive is provided, and the first and additional guide bodies have at least one driving apparatus to move them successively along the guide.

13 Claims, 4 Drawing Sheets

(51) Int. Cl.
*B33Y 30/00* (2015.01)
*B22F 10/10* (2021.01)

(56) References Cited

U.S. PATENT DOCUMENTS

| | | | |
|---|---|---|---|
| 2006/0163007 A1* | 7/2006 | Bukowski | B66F 7/18 |
| | | | 187/269 |
| 2007/0037509 A1* | 2/2007 | Renz | B22F 12/00 |
| | | | 454/354 |

FOREIGN PATENT DOCUMENTS

| | | |
|---|---|---|
| DE | 102007014968 A1 | 10/2008 |
| DE | 102010006939 A1 | 8/2011 |
| DE | 102013222339 A1 | 5/2015 |
| DE | 102015000003 A1 | 7/2016 |
| EP | 3159142 A1 | 4/2017 |
| WO | WO 2000/021736 A1 | 4/2000 |
| WO | WO 2002/26420 A1 | 4/2002 |
| WO | WO 2016/207258 A1 | 12/2016 |
| WO | WO 2019/076705 A1 | 4/2019 |

\* cited by examiner

LIFTING APPARATUSES FOR BUILDING CYLINDERS IN MACHINES FOR PRODUCING 3D COMPONENTS, AND METHODS FOR CONTROLLING THE LIFTING APPARATUSES

CROSS REFERENCE TO RELATED APPLICATIONS

This application is a continuation of and claims priority under 35 U.S.C. § 120 from PCT Application No. PCT/EP2018/077637, filed on Oct. 10, 2018, which claims priority from German Application No. 10 2017 124 424.7, filed on Oct. 19, 2017. The entire contents of each of these priority applications are incorporated herein by reference.

TECHNICAL FIELD

The disclosure relates to a lifting apparatus for a building cylinder in a machine for applying in layers and selectively consolidating a powdered build-up material for producing a three-dimensional component, and to a machine, having a lifting apparatus of this kind, for producing such three-dimensional components, and to a method for controlling the lifting apparatus to load and unload and operate a building cylinder in such a machine.

BACKGROUND

Document DE 103 42 882 A1 discloses a machine and a method for producing a three-dimensional component in a building cylinder by applying in layers and selectively consolidating a powdered build-up material. This machine includes a process chamber, which in a horizontal plane has a working surface, which is associated with a building cylinder arranged fixedly thereon. An application and levelling apparatus is provided movably above the working surface, by means of which apparatus a build-up material is supplied to the building cylinder from a storage chamber, with excess build-up material being discharged into a collection container. This process chamber is associated with a laser source, and a scanner, to direct a processing beam of the laser source selectively towards the powdered build-up material in the building cylinder to create a selective consolidation to form a three-dimensional component.

A substrate plate movable up and down is provided in the building cylinder, with the three-dimensional component being constructed on the substrate plate. By lowering the substrate plate in the building cylinder in steps in accordance with the formed layer, the three-dimensional component is produced bit by bit. A lifting cylinder is provided to move this substrate plate up and down, which lifting cylinder requires an installation space corresponding to the stroke path of the building platform in the building cylinder.

Furthermore, a machine of this kind is known in which the building cylinder is provided exchangeably relative to the work surface in a process chamber. The building cylinder is lowered downwardly relative to the work surface so that the building cylinder then can be removed using a tool. A lifting cylinder provided for this purpose has an increased installation space or an overall height, since this implements both the stroke movement of the substrate plate within the building cylinder during the production of the three-dimensional component and also the movement up and down of the building cylinder between a loading and unloading position and the working position at the working surface.

SUMMARY

The present disclosure provides lifting apparatus and machines including such lifting apparatus, and also methods for controlling the lifting apparatus and for operating the building cylinder to load and unload a building cylinder into/from the machine, which building cylinder has a short overall height.

In one aspect, the disclosure provides a lifting apparatus for a building cylinder in a machine for applying in layers and selectively consolidating a powdered build-up material for producing a three-dimensional component. The lifting apparatus includes a drive unit having a first guide body and at least one second guide body, which are movable along at least one guide by at least one driving apparatus so that a first bracket on the first guide body. The bracket receives the building cylinder, and is moved consecutively or successively to a second bracket on the at least one further guide body, on which a main drive is provided for controlling a movement of the substrate plate in the building cylinder.

A nested drive system is created by this driving apparatus and the at least one guide body on the at least one guide, whereby the stroke movements for the up and down movement of the building cylinder between a loading and unloading position and a working position at a working surface on the one hand and for the up and down movement of the substrate plate within the building cylinder on the other hand are made possible. A reduction in the overall height of the lifting apparatus is thus achieved. To perform the necessary stroke movements, the first and at least one further guide body are controlled with a caterpillar-like movement, that is to say firstly the first guide body is controlled with a movement and the at least one further guide body is stopped or is held fixed in relation to the at least one guide. Once the stroke movement has been performed, a change is made so that the moved guide body is stopped and the unmoved guide body is moved. The control of the guide bodies is then changed again for the subsequent movement.

Linear guide bodies are preferably provided. These enable an exact movement, which can also be monitored. Single-level linear guide bodies are preferably provided. This enables the use of more economical guide bodies. In addition, a redundancy in the drive is provided, whereby this lifting apparatus can be provided cost-effectively.

A further embodiment of the lifting apparatus provides that the first and at least one further guide body each have at least one slide, the slides being movable along the at least one guide, and that the at least one driving apparatus acts on the slides or on the brackets of the guide bodies. The caterpillar movement can thus be controlled easily, wherein a high precision of the movement is provided, since the linear guide bodies are moved along the at least one guide.

Each guide body can include a separately controllable braking apparatus. This simplifies the control of the movement. Each guide body can also include a path measuring apparatus or a position detection sensor, which can use the at least one guide as a reference system. The path measuring apparatus measures the length of the movement of the first guide body and/or the second guide body. The position of each guide body can thus be queried and monitored in addition to the controlled movement, thus making it possible to increase the process reliability.

A further advantageous embodiment of the lifting apparatus provides that the guide body receiving the building cylinder by means of the bracket is controllable synchronously with the movement of the piston by means of the main drive arranged on the further bracket of the further guide body. For example, once the first bracket has been loaded with a building cylinder and a piston has been coupled to the substrate plate of the building cylinder, the position of the substrate plate within the building cylinder from the loading position is maintained, in particular during the movement of the building cylinder into the working position.

To control a movement of the lifting apparatus, a control apparatus can be provided, which individually controls the braking apparatuses and the at least one driving apparatus controlling the stroke movement of the guide bodies so that the driving apparatus is controllable for a movement of at least one guide body only if the braking apparatus of one of the further guide bodies is closed. A controlled and successive movement of the guide bodies is thus made possible. The caterpillar movement can thus be controlled by means of a changeover in the control of the braking apparatus of the further guide body to the first guide body.

The first and at least one further guide body are preferably provided on a common guide. This common guide may have one, two, or more parallel guide rails. Non-parallel guide rails can also be provided, which together with the guide bodies lead to a stroke movement oriented in parallel.

The main drive provided on the further bracket of the at least one guide body can control a stroke movement of the piston arranged therein in a highly precise manner, for example, by means of a ball screw or telescopic ball screw.

The problem addressed by the new systems and methods is furthermore solved by a machine for producing a three-dimensional component by selective consolidation of a build-up material applied in layers by a beam acting on the build-up material, which machine has a lifting apparatus with a drive unit, which includes a first guide body and at least one second guide body, movable in succession along at least one guide by means of at least one driving apparatus, wherein the first guide body receives a first bracket, on which a building cylinder is arranged, and the at least one further guide body receives a further bracket, on which a main drive for controlling the substrate plate in the building cylinder is provided. By means of such a nested arrangement of the lifting apparatus, a reduced overall height is created, and yet it is possible to change a building cylinder, which likewise requires a stroke movement. The working surface in the process chamber is thus provided at a height so that a worker can see into the process chamber for monitoring purposes, without additional tools.

Furthermore, the at least one guide, in particular a common guide, of the guide bodies is oriented vertically and provided on a main frame of the machine. A precise connection of the building cylinder to the working surface can thus be enabled. The lifting apparatus includes guide bodies, e.g., linear guide bodies.

The problem addressed by the new systems and methods described herein is also achieved by methods for controlling a lifting apparatus for a change or operation of a building cylinder in a machine for producing three-dimensional components by selective consolidation of a build-up material applied in layers by means of a beam acting on the build-up material. In these methods a first guide body and at least one further guide body are controlled with a stroke movement along at least one guide by at least one driving apparatus in alternation. For example, the first guide body is stopped and the at least one further guide body is moved by the at least one drive assembly to perform a first stroke movement. The at least one further guide body is then stopped, and the first guide body is moved with a stroke movement. During the first stroke movement, the distance between the two adjacent guide bodies is generally increased, and with the subsequent stroke movement the distance between two guide bodies is reduced. A caterpillar-like movement can thus be controlled, whereby a relatively large stroke movement can be controlled and performed with a lifting apparatus having a small overall volume.

After each stroke movement of the guide body, a braking apparatus of one of the guide bodies can be controlled and closed to secure the lifting position, and the other braking apparatus is released for a stroke movement of the further guide body. It is thus ensured that the lifting apparatus maintains the last-assumed position in relation to the common guide and can be moved along the entire movement path of the at least one guide by the change of the successive stroke movements.

Furthermore, to load a building cylinder, a bracket provided on the first guide body can be lowered into a loading position in relation to the drive position, the building cylinder is placed on the first bracket, and then a first stroke movement is performed in the direction of the working plane of the working surface. The building cylinder can thus be released from a tool used to load and unload the building cylinder on/from the first bracket.

Furthermore, a main drive is controlled with an extension movement of the piston, wherein the main drive is arranged on a bracket of the at least one further guide body, and the piston is locked with a substrate plate in the building cylinder. A coupling of the piston from the main drive to the substrate plate in the building cylinder can thus easily be created. In addition, an indexing can be provided by the maintained position of the first guide body, to then be able to detect and monitor the further movements of the guide bodies.

Furthermore, the first guide body is preferably controlled with a stroke movement towards the working plane until this building cylinder is in line with the working surface, and, synchronously, the main drive is controlled so that the substrate plate within the building cylinder maintains the position it had at the time of being coupled to the piston. The building cylinder is thus transferred into a working position. The indexed position of the substrate plate in relation to the building cylinder can be maintained.

Furthermore, following the transfer of the building cylinder into the working position, the first guide body is stopped and the at least one further guide body is moved in the direction of the first guide body, and the main drive is controlled with a compensation movement. The piston position in the building cylinder is thus maintained, and the at least one further guide body can be transferred into a position relatively close to the working plane, so that the maximum stroke movement of the main drive is then available for a movement of the substrate plate within the building cylinder.

Furthermore, it can be provided that following the transfer of the building cylinder into the working position and the further stroke movement of the at least one guide body, the braking apparatuses of the first and at least one further guide body are active, to then start the production of the three-dimensional component. To this end, the substrate plate is moved into a starting position by the main drive, which lies in the support plane of the working surface. The substrate plate is then lowered in steps by means of the main drive depending on the thickness of the applied layer during the selective consolidation of the build-up material.

DESCRIPTION OF DRAWINGS

The invention and further advantageous embodiments and developments thereof will be described and explained in greater detail hereinafter with reference to the examples shown in the drawings. The features that can be inferred from the description and the drawings may be applied in accordance with the invention individually or together in any combination.

DETAILED DESCRIPTION

Figure 1:
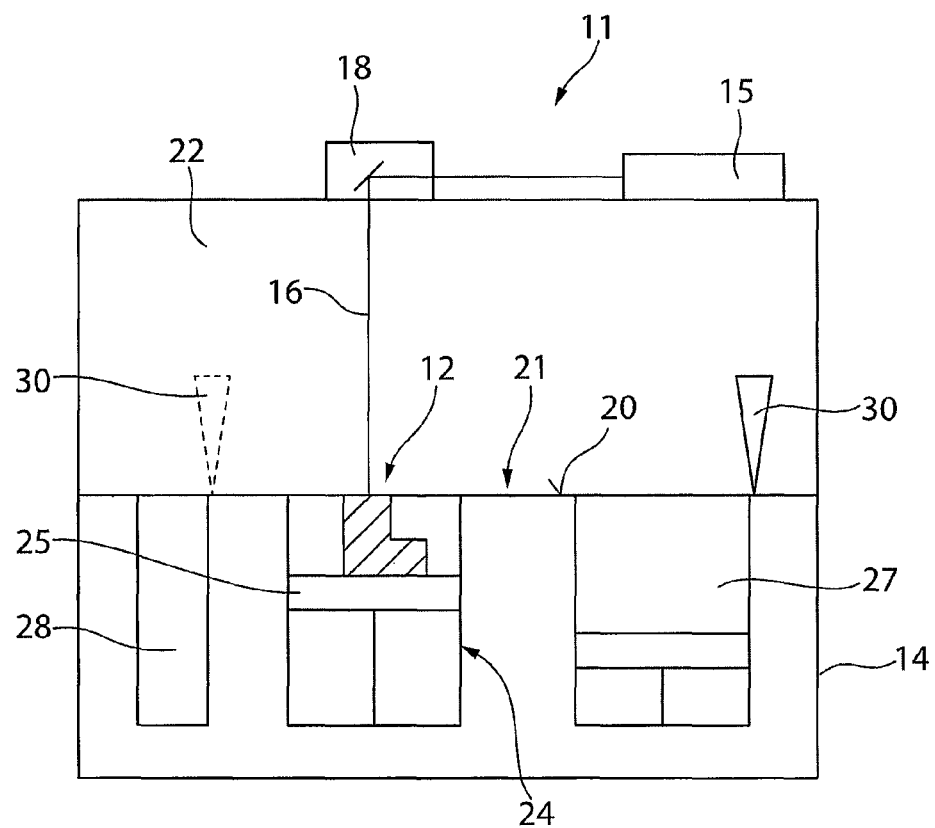
FIG. 1 is a schematic view of a machine for producing three-dimensional components.

FIG. 1 shows a schematic view of a machine 11 for producing a three-dimensional component 12 by a successive consolidation of layers of a powdered build-up material. This machine 11 includes a machine frame 14 and a beam source 15, for example in the form of a laser source, arranged on the machine frame 14. This beam source 15 emits a beam 16, which is steered and guided by means of a beam deflection device 18 towards a working plane 20 of a working surface 21 in a process chamber 22. The beam deflection apparatus 18 may be configured in the form of one or more controllable mirrors, in particular in the form of a scanner. A building cylinder 24 with a substrate plate 25 is provided below the working plane 20, which substrate plate is movable within the building cylinder 24 to create the three-dimensional component 12, building up from the substrate plate. Adjacently to the building cylinder 24, there is provided a storage chamber 27, which provides powdered build-up material. A collection chamber 28 is provided opposite the building cylinder 24. Proceeding from a start position shown on the right in FIG. 1, powdered build-up material is supplied to the building cylinder 24 by means of an application and levelling apparatus 30. Any build-up material not required is transferred by means of the application and levelling apparatus 30 into the collection chamber 28 (left end position) so that this material can be processed in turn and reused.

The build-up material preferably consists of a metal powder or ceramic powder. Other materials suitable and used for laser melting and laser sintering may also be employed. The process chamber 22 is preferably hermetically sealed. This process chamber is filled with shielding gas or an inert gas for the production of the three-dimensional component 12, to avoid oxidation as the build-up material is melted.

Figure 2:
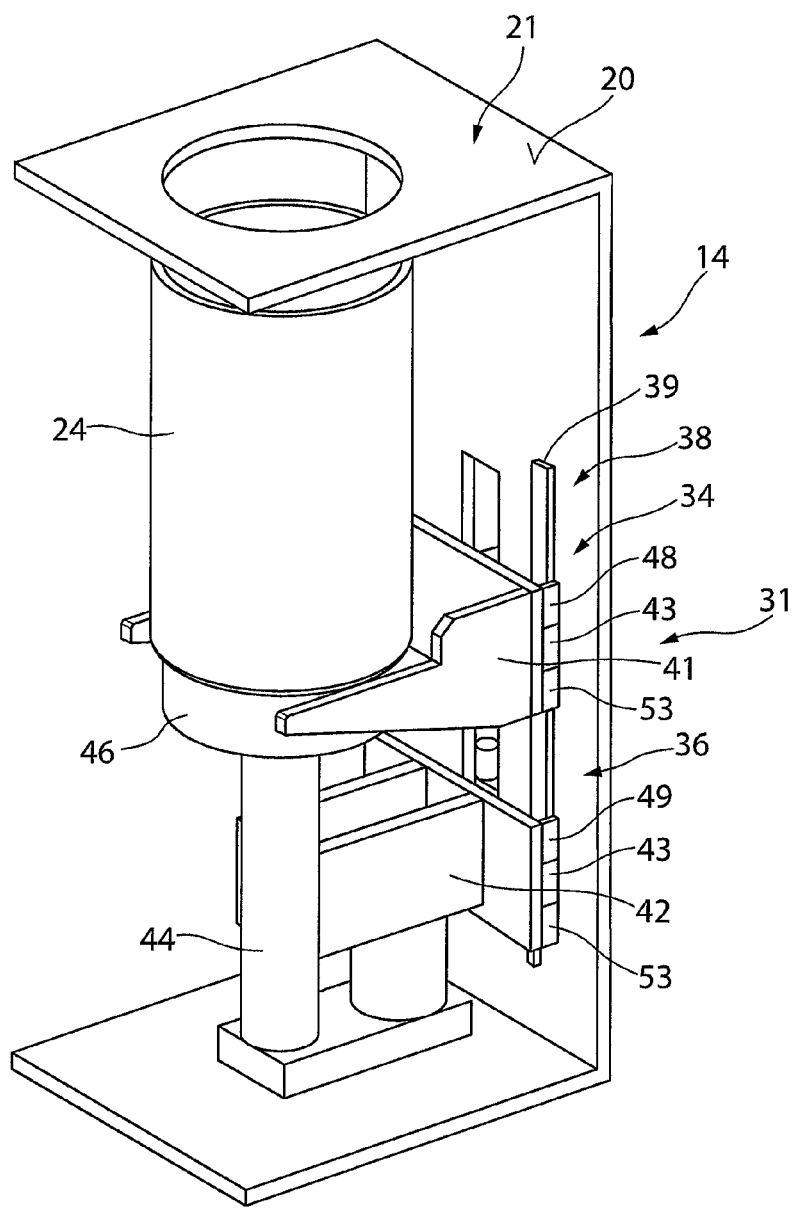
FIG. 2 is a perspective view of a lifting apparatus with a building cylinder.

FIG. 2 shows a perspective view of a lifting apparatus that enables both an exchange of the building cylinder 24 and control of a stroke movement of the substrate plate 25 within the building cylinder 24. This lifting apparatus includes a first, e.g., linear, guide body 34 and a second, e.g., linear, guide body 36. Both guide bodies 34, 36 are provided on at least one guide 38. In this embodiment, a common guide 38 is provided and is fixed on the machine main frame 14. This common guide 38 can include one or more guide rails 39, which are oriented parallel to one another and along which the guide bodies 34, 36 are movable. The first guide body 34 receives a bracket 41. The building cylinder 24 can be fitted onto and positioned on this bracket 41. The second linear guide body 36 receives a further bracket 42, on which a main drive 44 is positioned. This main drive 44 controls movement of a piston 46, which is lockable to the substrate plate 25 by a clamping system (not shown in greater detail). The piston 46 can include at least one heating apparatus to heat the substrate plate 25 to a working temperature. For example, this temperature may be in the range of about 500° C. The main drive 44 can be formed by a ball screw, by a trapezoidal spindle, or similar.

The first and second guide bodies 34, 36 are each guided movably by means of at least one slide 43 on the guide 38. The guide bodies 34, 36 each have a braking apparatus 48, 49, by which it is possible to fix the linear guide bodies 34, 36 in a position relative to the guide 38.

As shown in FIGS. 3 to 10, at least one driving apparatus 51 is provided between the first guide body 34 and the second or further guide body 36, which driving apparatus controls a movement of the guide bodies 34, 36 along the guide 38. This driving apparatus 51 can be implemented by a trapezoidal spindle or ball spindle or another continuously adjustable linear drive, which, for example, is driven by an electric motor. This driving apparatus 51 is what is known as an auxiliary drive, which can be produced economically in comparison to the main drive 44. The main drive 44 must be formed in a precise manner, since a stepwise movement of the substrate plate 25 with a short stroke path during the production of the three-dimensional component 12 is necessary.

The first and at least one further guide body 34, 36 furthermore include at least one position detection sensor 53, whereby the positions of the guide bodies 34, 36 relative to one another and height-wise in the machine frame 14 or in relation to the guide 38 are detectable.

Figure 3:
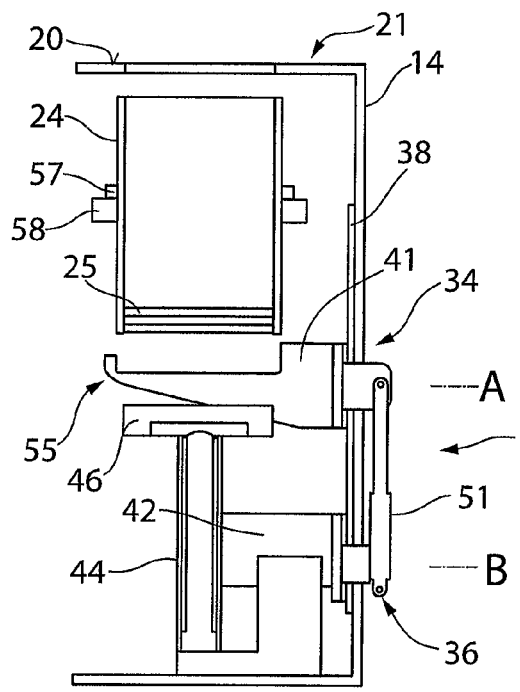
FIG. 3 is a schematic side view during the loading of the lifting apparatus with a building cylinder.
Figure 4:
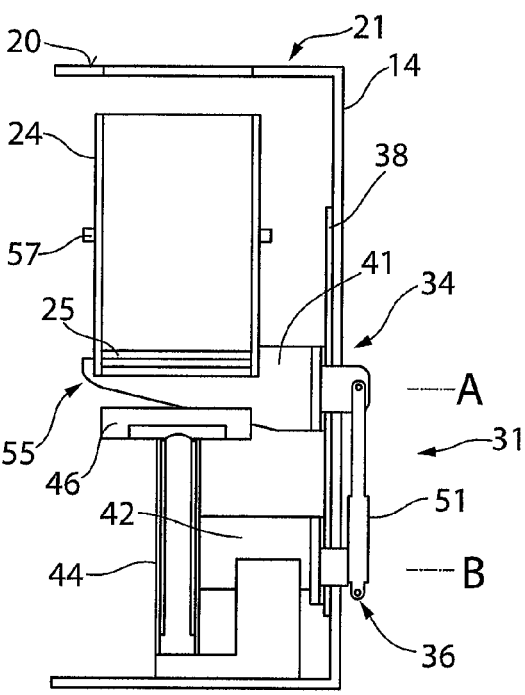
FIG. 4 is a schematic side view after the loading of the lifting apparatus with a building cylinder.

FIGS. 3 and 4 shows a schematic side view of the lifting apparatus. The lifting apparatus is arranged in a loading and unloading position 55. In this loading and unloading position 55, the first guide body 34 is in a position A. The second guide body 36 is in a lowermost position B. In position A, the bracket 41 of the first guide body 34 is lowered relative to the working plane 20 in such a way that the building cylinder 24 can be raised slightly using a tool, for example using a gripper 58 that engages beneath a gripping element 57 on the building cylinder 24, and the gripper 58 can then be removed. The same is true for the insertion of the building cylinder 24. The building cylinder 24 is fitted on the bracket 41. In this case, the bracket 41 may have a centering receptacle, to orient the building cylinder 24 in a defined position.

Figure 5:
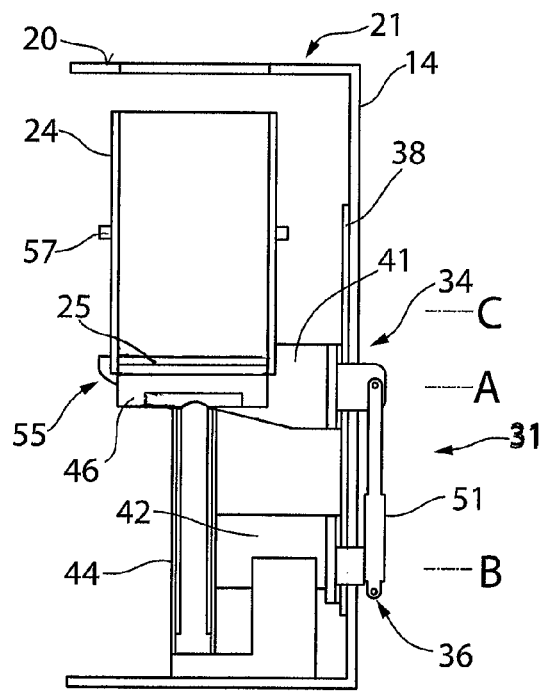
FIG. 5 is a schematic side view of the lifting apparatus with the building cylinder as a piston comes to bear against a substrate plate.

As shown in FIG. 5, the piston 46 is then raised and is attached to the substrate plate 25 in the building cylinder 24. The braking apparatuses of the guide body 34, 36 are closed. The positions A and B of the guide bodies 34, 36 are maintained. The main drive 44 is actuated, whereby the piston 46 is extended. As soon as the piston comes to bear against the substrate plate 25, it is locked in position by means of a clamping system (not shown).

Figure 6:
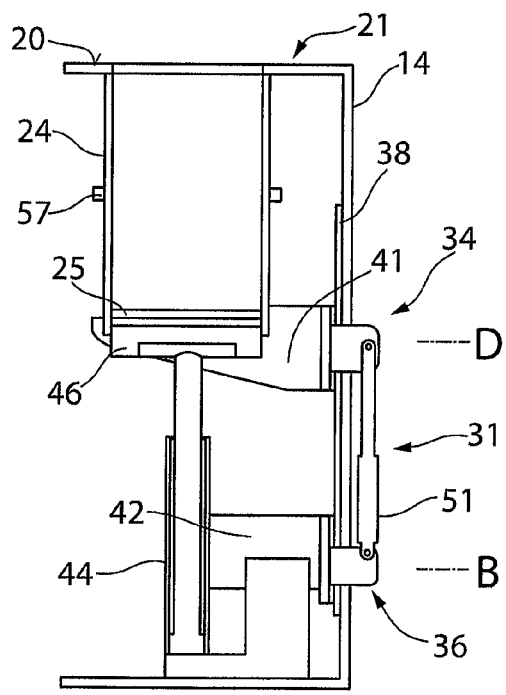
FIG. 6 is a schematic side view of the lifting apparatus with the building cylinder in a working position.

Following the connection of the piston 46 to the substrate plate 25, and as shown in FIG. 6, the braking apparatus 49 of the further guide body 36 can be released, so that the piston performs a stroke movement and is directly adjacent to the first guide body 34. At the same time, a compensation movement is controlled by the main drive 44, so that the piston 46 remains in its position relative to the building cylinder 24.

Following the connection of the piston 46 to the substrate plate 25, the braking apparatus 48 of the first guide body 34 can also be released, and the guide body 34 can be transferred by means of the driving apparatus 51 into a working position. In this working position, the upper opening edge of the building cylinder 24 is aligned with the working surface 21. The upper opening of the building cylinder 24 lies in the working plane 20. This is shown in FIG. 6. On account of the connection of the piston 46 to the substrate plate 25, a synchronous compensation movement by the main drive 44 is necessary during the transfer of the building cylinder 24 into the working position, in other words, the piston 46 is extended, for example, to maintain the lower position of the substrate plate 25 during the movement of the building cylinder 24.

Figure 7:
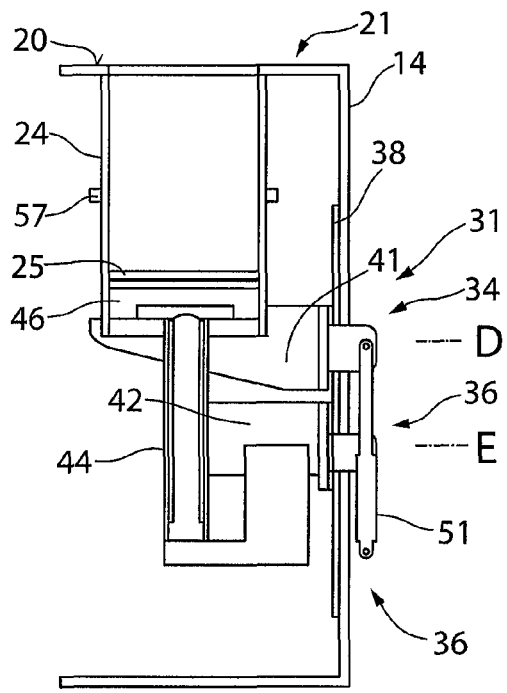
FIG. 7 is a schematic side view of the lifting apparatus with a substrate plate in an intermediate position.

In this working position according to FIG. 6, the braking apparatus 48 of the guide body 34 is closed, and the braking apparatus 49 of the guide body 36 is opened. The guide body 36 is then moved by means of the driving apparatus 51 into a position D, as shown in FIG. 7, so that the guide bodies 34, 36 are positioned close to one another. The braking apparatus 49 is then also closed. The total stroke movement of the main drive 44 is now available to control a stroke movement of the substrate plate 25.

Alternatively to the above-described sequence of the process steps for positioning the building cylinder 24 relative to the working plane 20 and for connecting the piston 46 to the substrate plate 25, the following sequence may also be provided starting from FIG. 4: the building cylinder 24 is firstly transferred by means of the first guide body 34 into a working position, in which the upper opening edge of the building cylinder 24 is aligned with the working surface 21. The first guide body 34 is then stopped, or this position is fixed. The further guide body 36 then performs a stroke movement so that the piston 46 is guided as far as the substrate plate 25. The substrate plate 25 and the piston 46 are coupled to one another. The further guide body 36 is stopped, and the braking apparatus 49 is fixed. As a result of this alternative procedure, the position of the building cylinder 24 in relation to the working surface 21 as shown in FIG. 7 is likewise assumed, as is also the position of the first and further guide bodies 34, 36 of the lifting apparatus 51 according to the illustration in FIG. 7.

Figure 8:
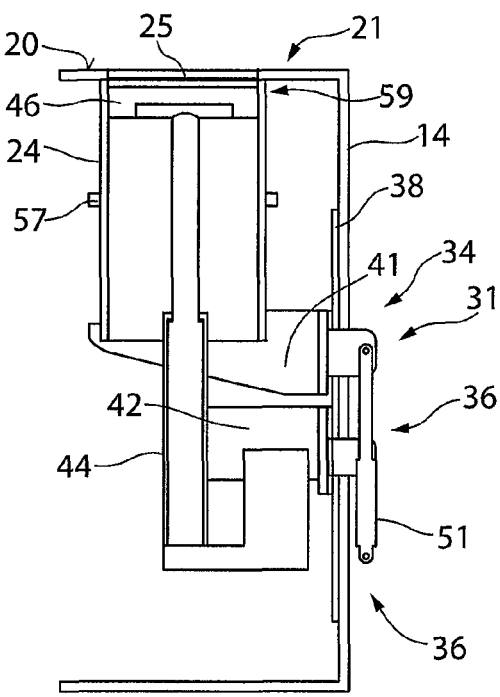
FIG. 8 is a schematic side view of the lifting apparatus in a starting position for the production of a three-dimensional component.

By means of an extension movement of the main drive 44, the substrate plate 25 is transferred into a start position 59 for the production of the three-dimensional component 12. This start position 59 is shown in FIG. 8. Starting from this start position 59, the three-dimensional component 12 is produced by selective consolidation of the build-up material. In this case, the substrate plate 25 is moved downwardly in steps, into the building cylinder 24, by the main drive 44 as soon as a layer on the component 12 has been consolidated. The movement preferably includes a stroke, which corresponds to the applied layer.

Figure 9:
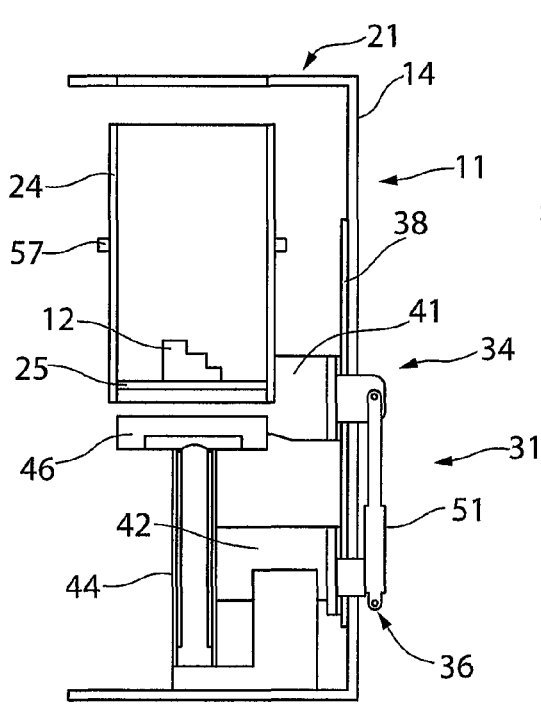
FIG. 9 is a schematic side view of the lifting apparatus with the building cylinder in an unloading position.

At the end of the production process the guide bodies 34, 36 are controlled in the reverse order, as is described in FIGS. 3 to 8, until the position in FIG. 9 is assumed. The substrate plate 25 is positioned by the main drive 44 in a lower end position in relation to the building cylinder 24. The clamping system is then released so that the piston 46 comes free from the substrate plate 25. The building cylinder 24 can then be removed.

Figure 10:
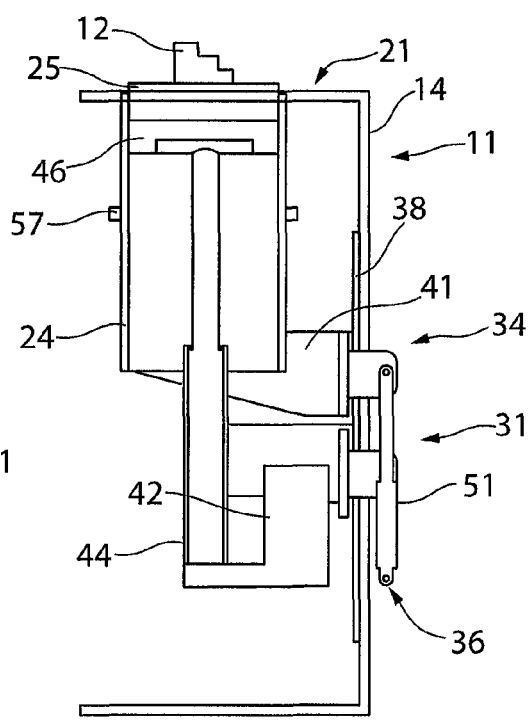
FIG. 10 is a schematic view of the lifting apparatus during a removal of the produced component with the building cylinder in a working position.

In FIG. 10 an arrangement of the substrate plate 25 in the building cylinder 24 is shown, in which the three-dimensional component 12 is removed directly from the substrate plate 25 or the substrate plate 25 is removed from the building cylinder 24.

By means of the arrangement of the at least two linear guide bodies 34, 36 along a common guide, which are driven by the driving apparatus 51, and the arrangement of the main drive 44 on one of the two guide bodies 34, 36, an interconnected drive system can be created to form the lifting apparatus with a small overall volume and enable a large overall stroke. Due to the controllable caterpillar-like movement of the first and further guide bodies 34, 36, the main drive 44 is also moved along the guide 38 so that the stroke length thereof is determined substantially by the height of the building cylinder 24. The further necessary stroke paths are balanced by the first and second guide bodies 34, 36.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A lifting apparatus for a building cylinder in a machine for producing a three-dimensional component by selective consolidation of a build-up material applied in layers by means of a beam acting on the build-up material, the lifting apparatus comprising
 a first bracket arranged to receive the building cylinder;
 a first guide body that controls the first bracket movably and moves the building cylinder into a working plane of a working surface in a process chamber;
 a second guide body associated with the first guide body and having a second bracket, wherein both the first and the second guide bodies are movable on at least one guide; and
 a main drive that controls a piston that is configured to be coupled to a substrate plate of the building cylinder with a stroke movement, wherein the main drive is arranged on the second bracket, and wherein the first and second guide bodies include at least one driving apparatus arranged to move the first and second guide bodies successively along the at least one guide.
2. The lifting apparatus of claim 1, wherein the first and second guide bodies comprise linear guide bodies or single-level linear guide bodies.
3. The lifting apparatus of claim 1, wherein the first and second guide bodies each have at least one slide, which slides are movable along the at least one guide, and wherein the at least one drive apparatus acts on the slides or the brackets of the first and second guide bodies.
4. The lifting apparatus of claim 1, wherein each of the first and second guide bodies comprises a separately controllable braking apparatus.
5. The lifting apparatus of claim 1, wherein each of the first and second guide bodies comprises a path measuring apparatus or a position detection sensor.

6. The lifting apparatus of claim 5, wherein the path measuring apparatus or the position detection sensor uses the at least one guide as a reference system.

7. The lifting apparatus of claim 1, wherein movement of the first guide body receiving the building cylinder by the first bracket is synchronously controllable with the movement of the piston by means of the main drive arranged on the second bracket of the second guide body.

8. The lifting apparatus of claim 4, wherein a control apparatus is provided to control the braking apparatuses and the at least one driving apparatus of the first and second guide bodies, wherein the driving apparatus controls a stroke movement only if the braking apparatus of the first guide body or of the second guide body is closed.

9. The lifting apparatus of claim 1, wherein the first and second guide bodies are movable on a common guide.

10. The lifting apparatus of claim 1, wherein the main drive controls a stroke movement of the piston via a ball screw or a telescopic ball screw.

11. A machine for producing three-dimensional components by selective consolidation of a build-up material applied in layers by a beam acting on the build-up material, comprising
- at least one process chamber, which has at least one working surface oriented at least in an x-/y-plane;
- a building cylinder exchangeably associated with the process chamber;
- a substrate plate arranged within the building cylinder on which the three-dimensional component is produced;
- a main drive arranged to control movement of the substrate plate;
- a beam source arranged to produce the beam;
- at least one deflection apparatus, by which the at least one beam is guided and deflected towards the build-up material to be consolidated in the building cylinder;
- an application and levelling apparatus, which is movable above the working surface to apply the build-up material relative to the building cylinder;
- a first bracket arranged to receive the building cylinder and to move the building cylinder in a working plane of the working surface in the process chamber;
- a first guide body arranged to control movement of the first bracket;
- a lifting apparatus, in which the first guide body is associated with a second guide body, which are both movable along at least one guide,
- wherein the second guide body comprises a second bracket, on which the main drive is provided, and
- wherein the first and second guide bodies are movable successively along the at least one guide by means of at least one drive apparatus.

12. The machine of claim 11, wherein at least one of the first and second guide bodies of the lifting apparatus is oriented vertically and is fastened to a machine main frame.

13. The machine of claim 12, wherein the first and second guide bodies of the lifting apparatus comprise linear guide bodies.

* * * * *